May 30, 1961

F. G. BROCKMAN 2,985,939

PROCESS OF MAKING A FERROMAGNETIC CORE
HAVING A PREDETERMINED PERMEABILITY

Original Filed July 10, 1952

INVENTOR.
FRANK G. BROCKMAN
BY
AGENT

May 30, 1961 F. G. BROCKMAN 2,985,939
PROCESS OF MAKING A FERROMAGNETIC CORE
HAVING A PREDETERMINED PERMEABILITY
Original Filed July 10, 1952 2 Sheets-Sheet 2

INVENTOR.
FRANK G. BROCKMAN
BY
AGENT

United States Patent Office 2,985,939
Patented May 30, 1961

2,985,939
PROCESS OF MAKING A FERROMAGNETIC CORE HAVING A PREDETERMINED PERMEABILITY
Frank G. Brockman, Dobbs Ferry, N.Y., assignor to Philips Laboratories, Inc., Irvington-on-Hudson, N.Y.
Original application July 10, 1952, Ser. No. 298,052. Divided and this application June 18, 1958, Ser. No. 744,311
1 Claim. (Cl. 25—157)

My invention relates to a magnetic core in which variations of permeability with temperature can be controlled. In particular, the invention relates to magnetic cores comprising essentially one or more ferrites.

The ferrites are compositions of one or more oxides of certain bivalent metals and ferric oxide which have been sintered to produce a material having very high values of initial permeability. These materials have been fully described in U.S. Patents #2,452,529, #2,452,530, #2,452,531, #2,551,711, #2,579,978 and in a monograph by J. L. Snoek, "New Developments in Ferromagnetic Materials," 1947. The materials disclosed in those patents have a high initial permeability, i.e., several hundred or more, and a low loss factor, which makes them particularly applicable at high frequencies in induction coils for, for example, permeability tuning.

An important property required of magnetic cores for such induction coils is stability—the inductance should vary as little as possible with temperature. In general, it is exceedingly difficult, if not practically impossible, to obtain a ferrite core having substantially constant permeability over a broad range of temperatures.

There are other applications for ferrite cores in which it might be desirable to obtain a core which exhibits rapid changes in permeability with changes in temperature. Such cores may, for example, be utilized in temperature measuring devices or as a temperature compensating element to compensate for changes in inductance of some other circuit element. In such cases, the composition of the ferrite material alone does not provide sufficient flexibility of control of the permeability-temperature characteristic of the core.

The present invention is directed to a novel technique for obtaining ferrite cores having any desired permeability-temperature characteristic. In particular, I have found that it is possible to control the permeability versus temperature curve of a ferrite core by forming a laminar body of two or more ferrite materials having different permeability-temperature characteristics which will result in a body having a new characteristic. This technique is particularly advantageous because the new permeability-temperature characteristic of the laminar body can be approximately predicted from the permeability-temperature characteristics of each of the ferrites used so that it is possible from the characteristics of the ferrites alone to determine, in advance, what ferrites and the amounts thereof which are necessary to produce the required characteristic.

In accordance with my invention I am able to determine empirically upon the basis of the following formula the relative proportions of the two or more ferromagnetic ferrites constituting separate laminae in the core. I have found that the resultant pemeability $\mu_r$ of the core according to my invention is related to the cross-sectional areas $A_1$ and $A_2$ respectively of the laminar sections constituted of different ferromagnetic ferrites having permeabilities $\mu_1$ and $\mu_2$ respectively by the relationship:

$$\mu_r = \mu_1 \frac{A_1}{A} + \mu_2 \frac{A_2}{A}$$

$A$ being the total cross-sectional area of the core perpendicular to the path of the flux.

A ferrite core in accordance with the invention can be prepared by assembling two or more cores of the same geometrical shape each of which has a desired temperature-permeability characteristic chosen to compensate for temperature variations in permeability of other portions of the core. The cores are assembled so that the path of flux is parallel to the abutting faces of each of the cores and the cores joined together either mechanically or by firing at a temperature at which the cores fuse without diffusion of one core material into another.

A preferred arrangement is a laminae core consisting of two sections; one section having a low Curie point (below about 110° C. and above room temperature) and the other section having a higher Curie point (between about 110° C. and about 250° C.), which arrangement has the advantage that relatively flat temperature-permeability characteristics are obtained.

The core is preferably prepared by placing in a mold a first ferrite material in powder form and levelling its surface and placing thereover a second ferrite in powder form. The core is then pressed and sintered to produce a laminar core of at least two different ferrites. In firing, there may be some diffusion of one ferrite into another. This may be minimized by a careful choice of the sintering temperature, f.i., by maintaining it at a sufficiently low value consistent with producing a core having mechanical stability or by limiting the sintering time.

The invention will be described with reference to accompanying drawing in which.

Figure 1:
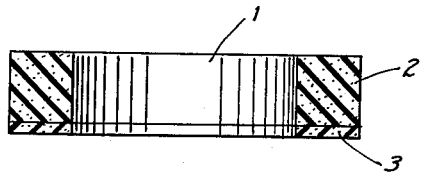
Fig. 1 shows, in cross-section, a laminar core according to the invention.
Figure 2:
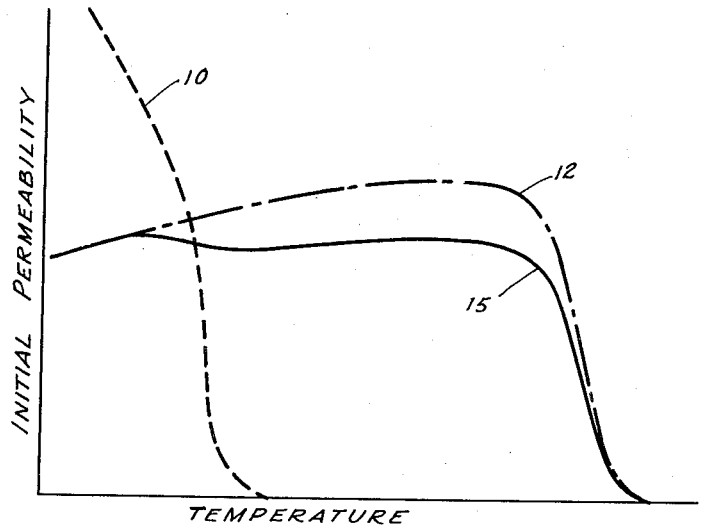
Fig. 2 shows curves of permeability plotted against temperature of two ferrite materials used in the core and a like curve for a composite core made up of laminae of the two materials.

The core 1 shown in Fig. 1 is composed of two laminae 2, 3, each of which consists of a particular ferrite having a temperature dependance of permeability illustrated by curves 10 and 12 in Fig. 2. The temperature permeability characteristic of the composite core is shown by the curve designated 15 in Fig. 2.

Each of the laminae constituting the core consists of a nickel-zinc ferrite of the type described in the above-noted patents. While I have chosen to illustrate by invention with those ferrites, I wish it to be understood that I could have illustrated the invention with other types of ferrites described in those patents such as copper-zinc ferrite, copper-cadmium ferrite, magnesium-zinc ferrite, manganese-zinc ferrite or any combination of those ferrites.

The first ferrite was prepared by mixing 15 mol. percent of NiO, 35 mol. percent of ZnO and 50 mol. percent of $Fe_2O_3$, sintering the mixture as described in the patents and pulverizing the ferrite mass thereby produced. The second ferrite was prepared by mixing 20 mol. percent of NiO, 30 mol. percent of ZnO and 50 mol. percent of $Fe_2O_3$ sintering and pulverizing the sintered mass in exactly the same manner as in the case of the first ferrite.

The first ferrite powder was placed in a ring-shaped mold, its surface carefully levelled off and the second ferrite powder placed over the first ferrite in a ratio of nine parts of the second ferrite to one part of the first ferrite powder in the mold, the powders pressed at a pressure of about 15,100 lbs./in² and sintered at 1250° C. for one hour. The resulting core had a laminar structure and a temperature permeability characteristic as shown in Fig. 2 by the solid line designated 15.

Figure 3:
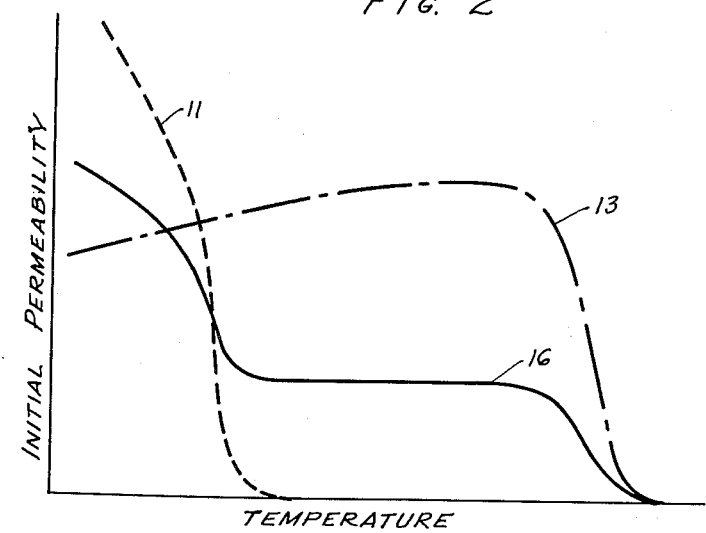
Fig. 3 shows a curve of permeability plotted against temperature of two ferrite materials and a like curve for a composite core made up of laminae of those materials.

A similar core was prepared by varying the proportions of the two ferrites. Fig. 3 shows the temperature-permeability curves of the individual ferrites as well as the temperature-permeability curve of the composite core. The composite core consists of two laminae, each respectively, consisting of the ferrites described above but in equal proportions of the two ferrites. Curve 16 is the temperature-permeability characteristics of the composite core.

Figure 4:
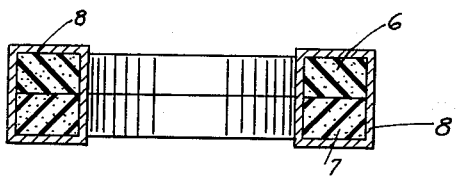
Fig. 4 shows another embodiment of a core according to the invention.

An alternative embodiment of my invention is shown in Fig. 4. Instead of fusing the two ferrites by sintering, ring-shaped sections 6 and 7 each of one of the ferrites described above can be prepared in the customary manner and placed one on top of the other and held together by a mechanical clamp 8. Furthermore, instead of the mechanical clamp, the cores can be cemented together with a nonmagnetic binder such as an ethoxyline resin which is aliphatic-aromatic chain molecules having at their ends a reactive ethylene oxide group.

Figure 5:
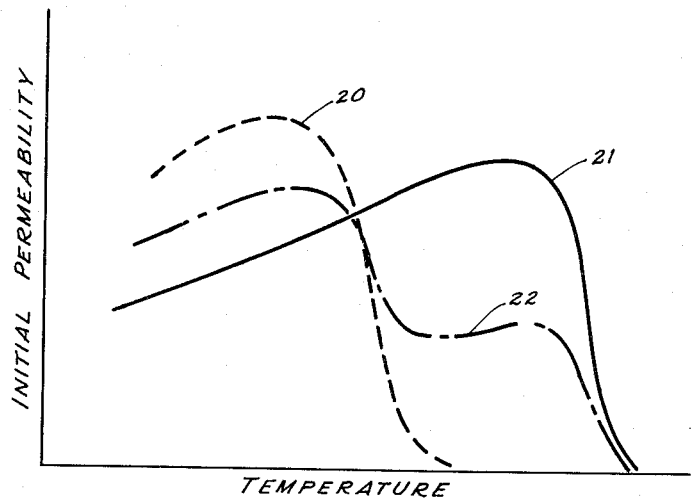
Fig. 5 shows curves of permeability plotted against temperature of two ferrite materials and a like curve for a composite core formed by mechanically joining two cores of the two ferrites.
Figure 6:
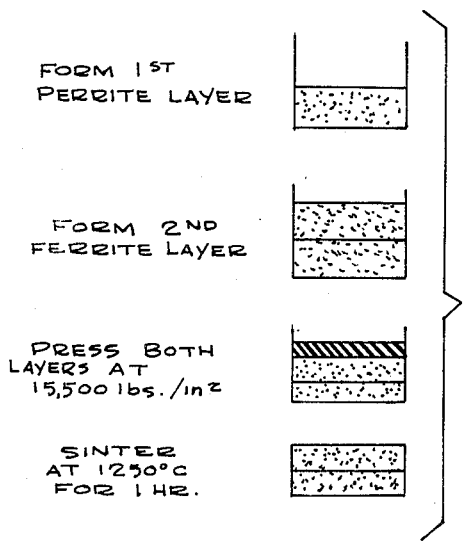

Fig. 5 shows the temperature-permeability characteristics of a ferrite core formed by mechanically clamping together two independently made cores as shown in Fig. 4. In this case, the upper core 6 was prepared by mixing 17 mol. percent of NiO, 33 mol. percent of ZnO and 50 mol. percent of $Fe_2O_3$, sintering the mixture as described in the patents and thoroughly pulverizing the ferrite mass thereby produced. Thereafter, the ferrite powders were placed in a ring-shaped mold and pressed and sintered in the same manner as that described in connection with the composite core shown in Fig. 1. The lower core 7 was prepared by mixing 20 mol. percent of NiO, 30 mol. percent of ZnO and 50 mol. percent of $Fe_2O_3$, and thereafter processing in the same manner as the upper core 6. The temperature-permeability characteristic of the upper core 6 is shown by the dashed curve 20 in Fig. 5 and the characteristic of the lower core 7 by the solid curve 21 in Fig. 5. The resultant permeability characteristic, as shown in Fig. 5 by the dash-dot curve designated 22, results from mechanically clamping cores 6, 7 of equal thickness together by a non-magnetic clamp 8 (Fig. 4).

While I have thus described my invention with reference to specific examples and application, I do not wish to be limited to those examples since other modification will be readily apparent to those skilled in the art without departing from the spirit and scope of my invention as defined in the appended claim.

What I claim is:

In the process of manufacturing a ferromagnetic core having a given temperature coefficient of permeability, the steps of forming a first layer of a nickel-zinc ferrite powder having a composition corresponding to about 15 mol percent of NiO, about 35 mol percent of ZnO, and about 50 mol percent of $FeO_{23}$, forming over said first layer a second layer of nickel-zinc ferrite powder having a composition corresponding to about 20 mol percent of NiO, about 35 mol percent of ZnO, and about 50 mol percent of $Fe_2O_3$, compressing said powders, and sintering said powders at a temperature of about 1250° C. for about one hour to form a core having a laminar structure.

References Cited in the file of this patent

UNITED STATES PATENTS

| | | |
|---|---|---|
| 1,141,134 | Metzner | June 1, 1915 |
| 1,448,684 | Beecher et al. | Mar. 13, 1923 |
| 2,158,132 | Legg | May 16, 1939 |
| 2,218,196 | Hagar | Oct. 15, 1940 |
| 2,241,441 | Bandur | May 13, 1941 |
| 2,267,954 | Schumacher | Dec. 30, 1941 |
| 2,551,711 | Snoek et al. | May 8, 1951 |
| 2,648,804 | Steigerwalt et al. | Aug. 11, 1953 |
| 2,830,320 | Geppert | Apr. 15, 1958 |

OTHER REFERENCES

Harvey et al.: "Ferromagnetic Spinels for Radio Frequencies," RCA Review, Sept. 1950, vol. XI, No. 3 pages 344–362.

UNITED STATES PATENT OFFICE
CERTIFICATION OF CORRECTION

Patent No. 2,985,939                          May 30, 1961

Frank G. Brockman

It is hereby certified that error appears in the above numbered patent requiring correction and that the said Letters Patent should read as corrected below.

In the grant, lines 2 and 3, for "assignor to Philips Laboratories, Inc., of Irvington-on-Hudson, New York," read -- assignor, by mesne assignments, to North American Philips Company, Inc., of New York, N. Y., a corporation of Delaware, --; line 12, for "Philips Laboratories, Inc., its successors" read -- North American Philips Company, Inc., its successors --; in the heading to the printed specification, lines 4 and 5, for "assignor to Philips Laboratories, Inc., Irvington-on-Hudson, N. Y.," read -- assignor, by mesne assignments, to North American Philips Company, Inc., New York, N. Y., a corporation of Delaware --; column 4, line 19, for "$FeO_{23}$" read -- $Fe_2O_3$ --; line 22, for "35" read -- 30 --.

Signed and sealed this 7th day of November 1961.

(SEAL)
Attest:

ERNEST W. SWIDER                         DAVID L. LADD
Attesting Officer                     Commissioner of Patents